(12) United States Patent
Ramon et al.

(10) Patent No.: US 10,819,531 B2
(45) Date of Patent: Oct. 27, 2020

(54) COLLABORATION PLATFORM HAVING MODERATED CONTENT FLOW

(71) Applicant: BARCO NV, Kortrijk (BE)

(72) Inventors: Peter Ramon, Assebroek (BE); Ronny Dewaele, Zonnebeke (BE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 16/083,552

(22) PCT Filed: Mar. 8, 2016

(86) PCT No.: PCT/EP2016/054887
§ 371 (c)(1),
(2) Date: Sep. 10, 2018

(87) PCT Pub. No.: WO2017/152954
PCT Pub. Date: Sep. 14, 2017

(65) Prior Publication Data
US 2020/0007352 A1    Jan. 2, 2020

(51) Int. Cl.
| | |
|---|---|
| *H04L 12/18* | (2006.01) |
| *H04L 29/06* | (2006.01) |
| *H04L 29/08* | (2006.01) |
| *H04M 3/56* | (2006.01) |
| *H04N 21/24* | (2011.01) |

(52) U.S. Cl.
CPC ...... *H04L 12/1818* (2013.01); *H04L 12/1827* (2013.01); *H04L 65/403* (2013.01); *H04L 67/1095* (2013.01); *H04M 3/567* (2013.01); *H04N 21/2401* (2013.01)

(58) Field of Classification Search
None
See application file for complete search history.

(56) References Cited

U.S. PATENT DOCUMENTS

| | | | | |
|---|---|---|---|---|
| 2008/0091779 | A1* | 4/2008 | Chetuparambil | G06Q 10/10 709/204 |
| 2014/0189012 | A1* | 7/2014 | Nishida | H04L 65/403 709/204 |
| 2015/0189012 | A1* | 7/2015 | Jadhav | G09G 5/399 709/204 |

OTHER PUBLICATIONS

International Search Report for PCT/EP2016/054887 dated Aug. 11, 2016.
Written Opinion for PCT/EP2016/054887 dated Aug. 11, 2016.
IPRP for PCT/EP2016/054887 dated Apr. 30, 2018.

* cited by examiner

*Primary Examiner* — Cai Y Chen
(74) *Attorney, Agent, or Firm* — Bacon & Thomas, PLLC

(57) ABSTRACT

A system and method for digital collaboration where a primary node and at least one secondary node are provided connected over a local area network, at least one computing device having a display output, and a control service, where each node is connected to at least one dedicated display device, and each node having at least two image buffers each image buffer having buffered content. For each node, the selection of which buffer content of an image buffer is displayed onto the dedicated display depends on a state variable of the control service.

25 Claims, 6 Drawing Sheets

(overview system)

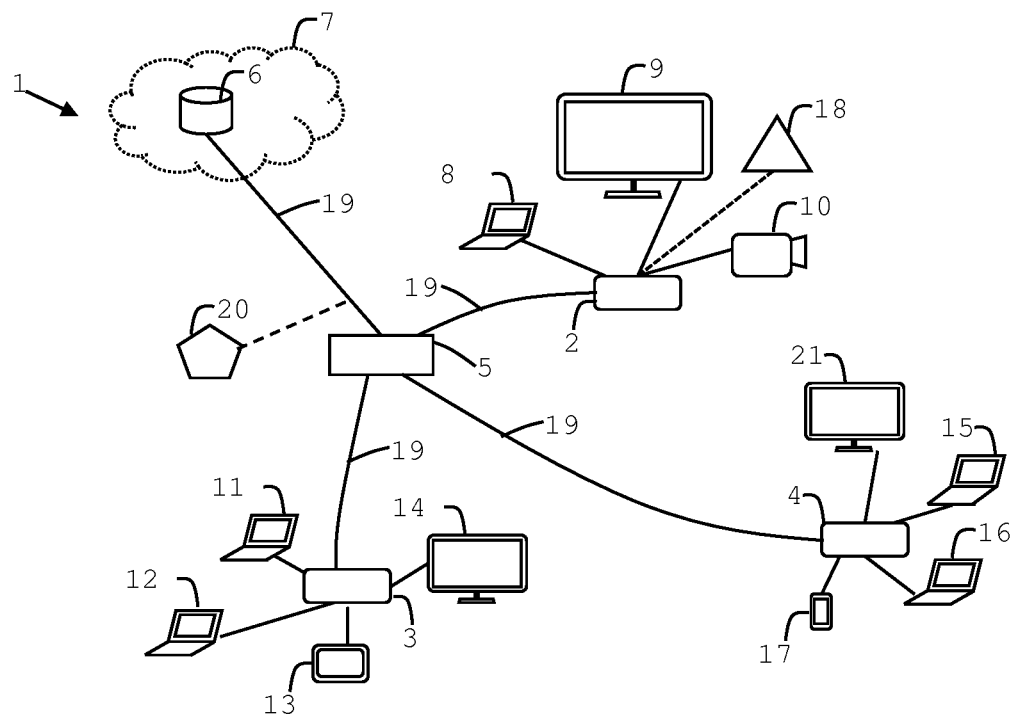
Figure 1 (overview system)
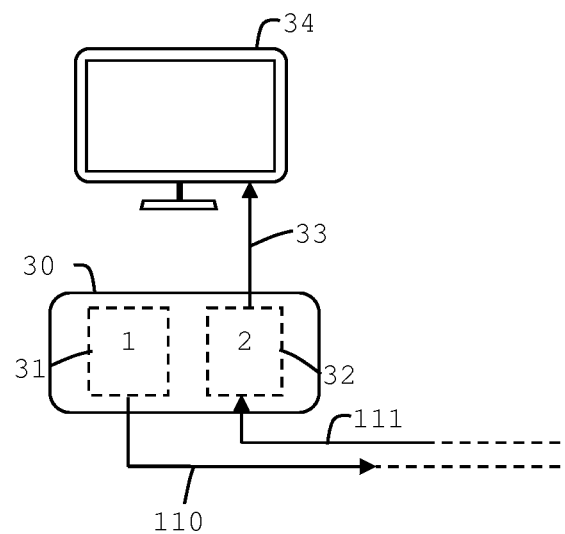
Figure 2 (hidden buffer)

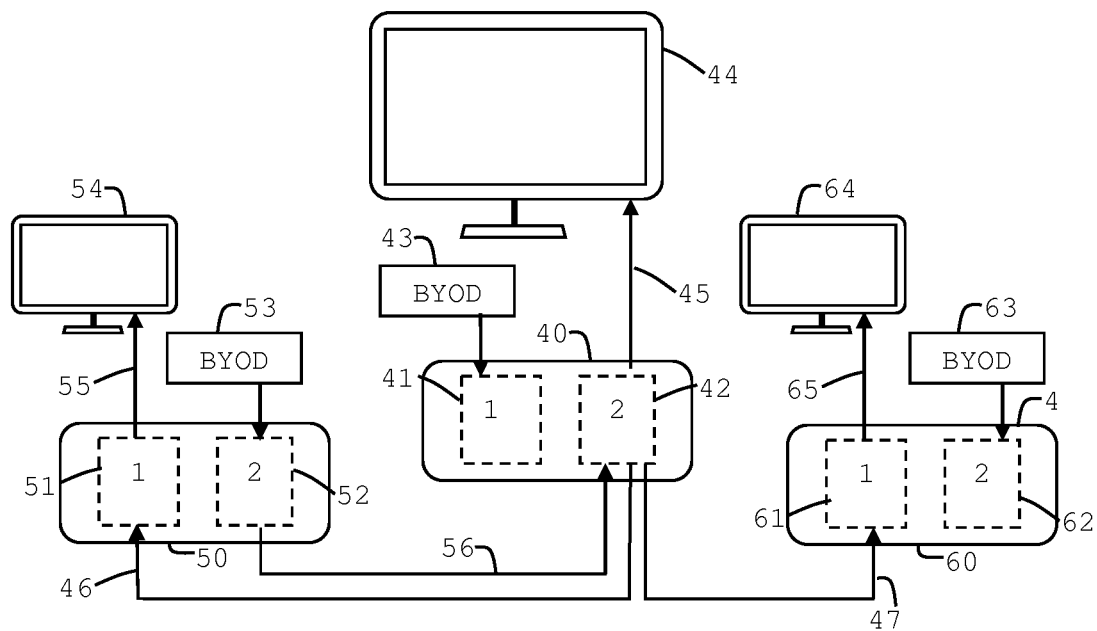
Figure 3a) (clone node 1)
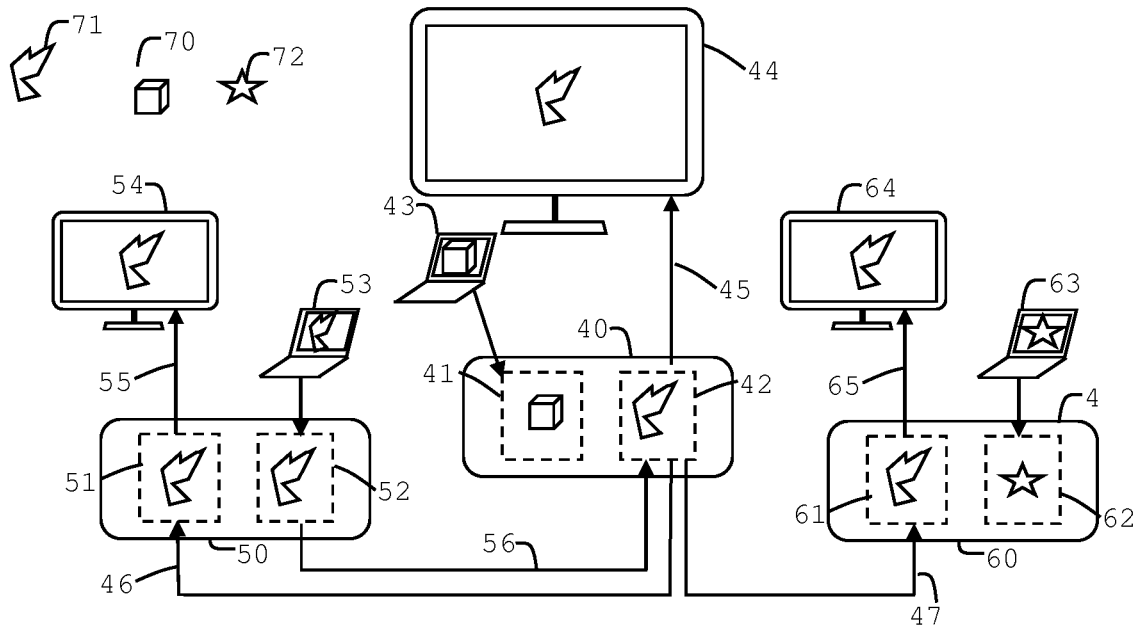
Figure 3b) (clone node 1, content)

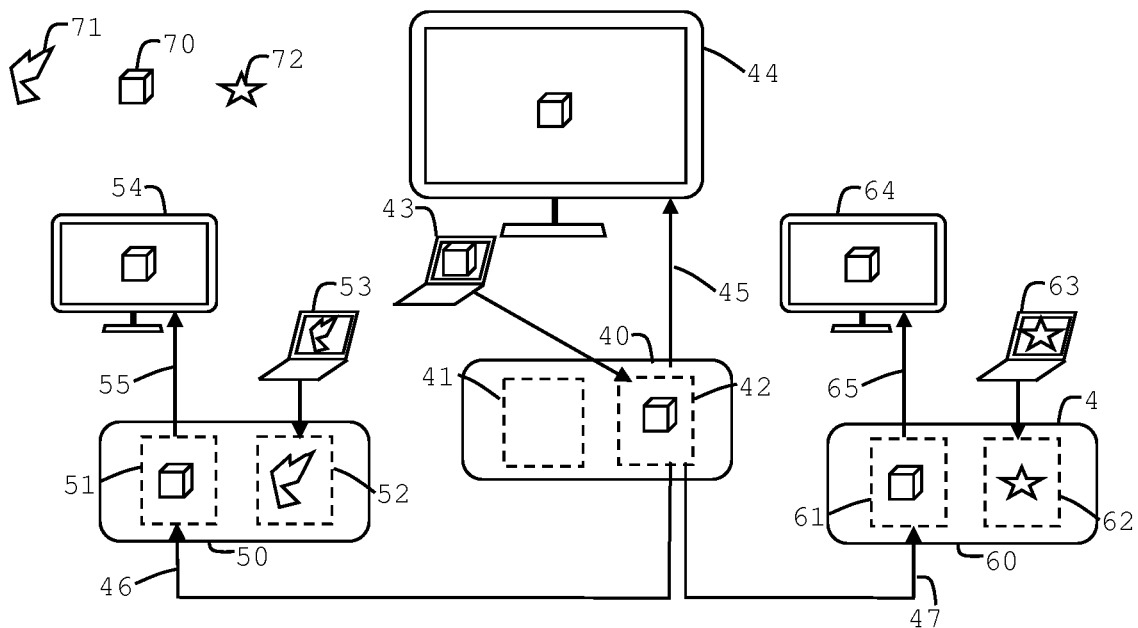
Figure 4 (share primary node)
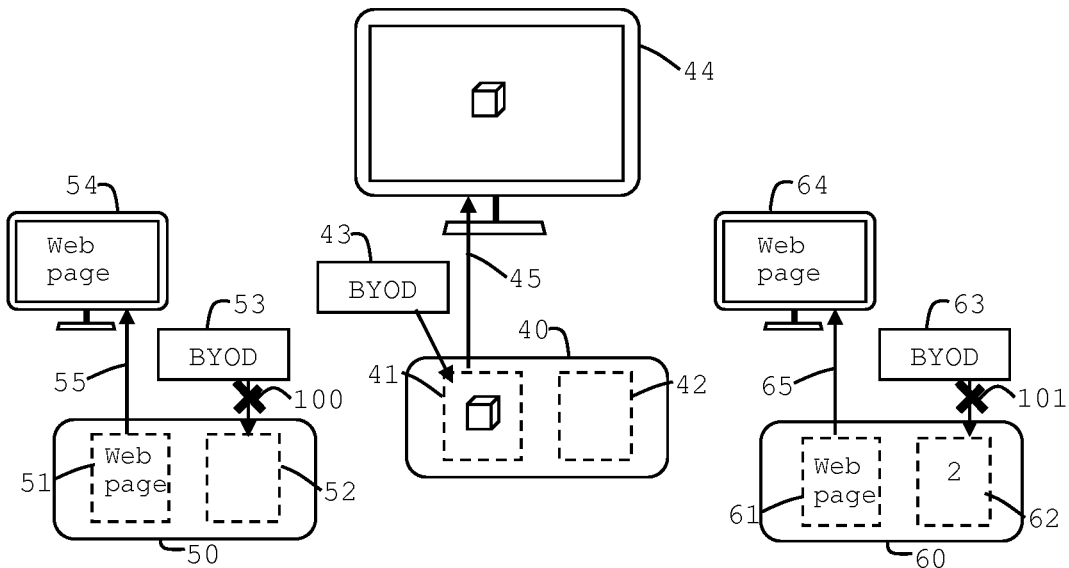
Figure 5 (blanking mode)

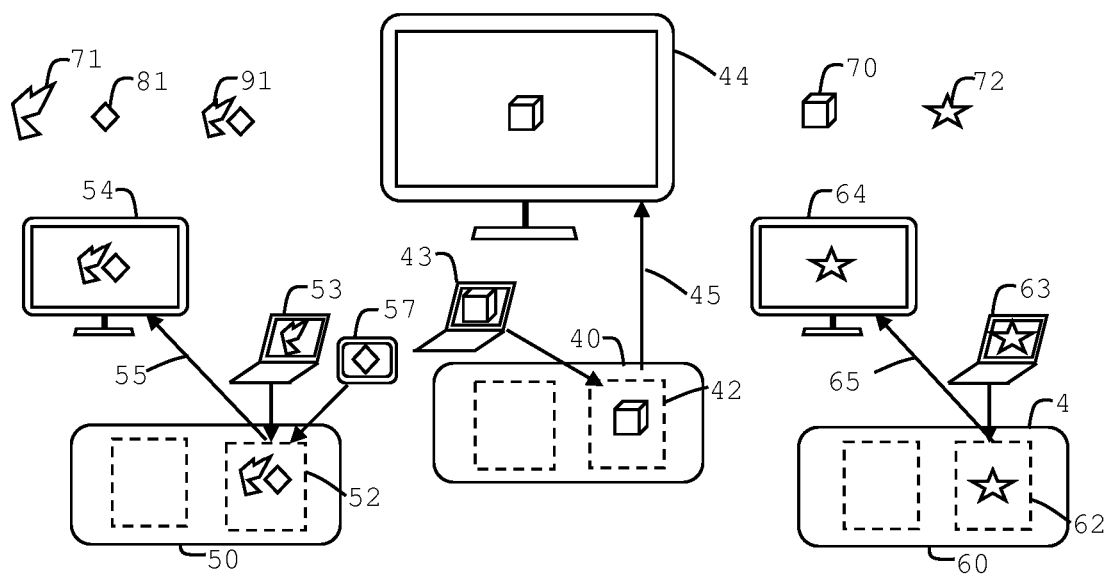
Figure 6 (collaboration mode)
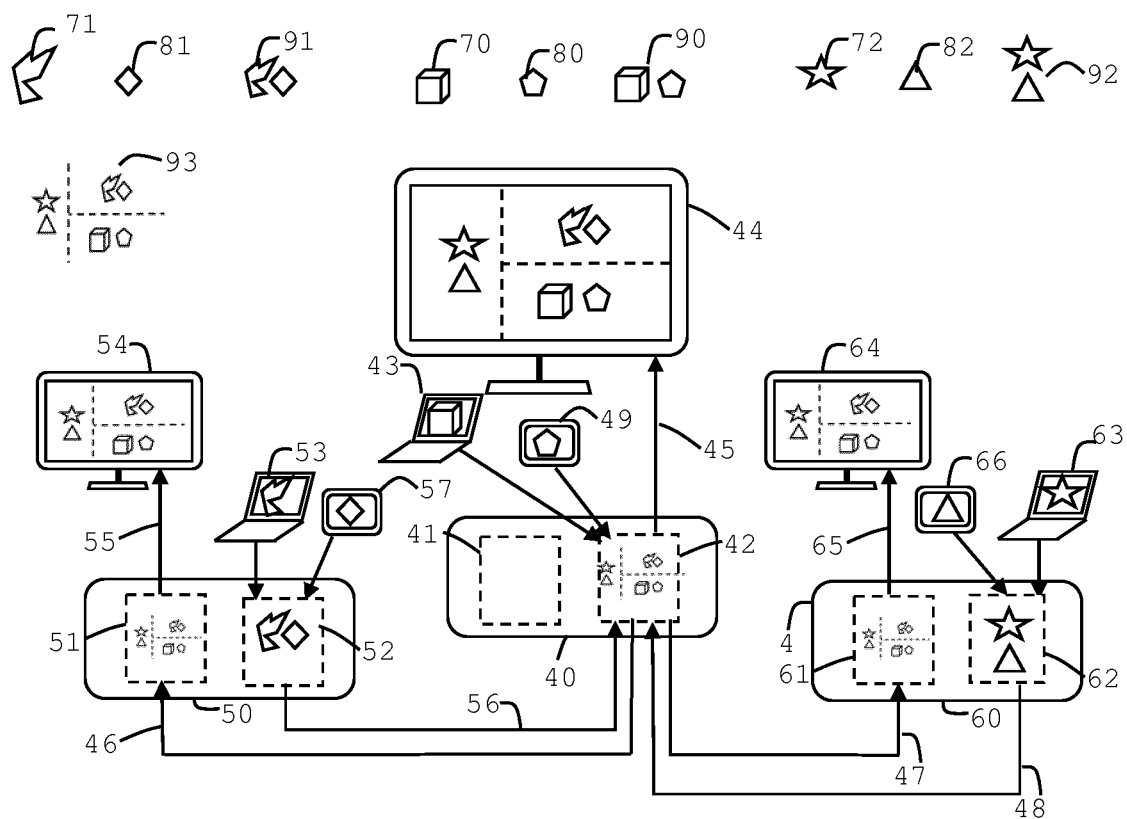
Figure 7 (clone and compose content from all nodes)

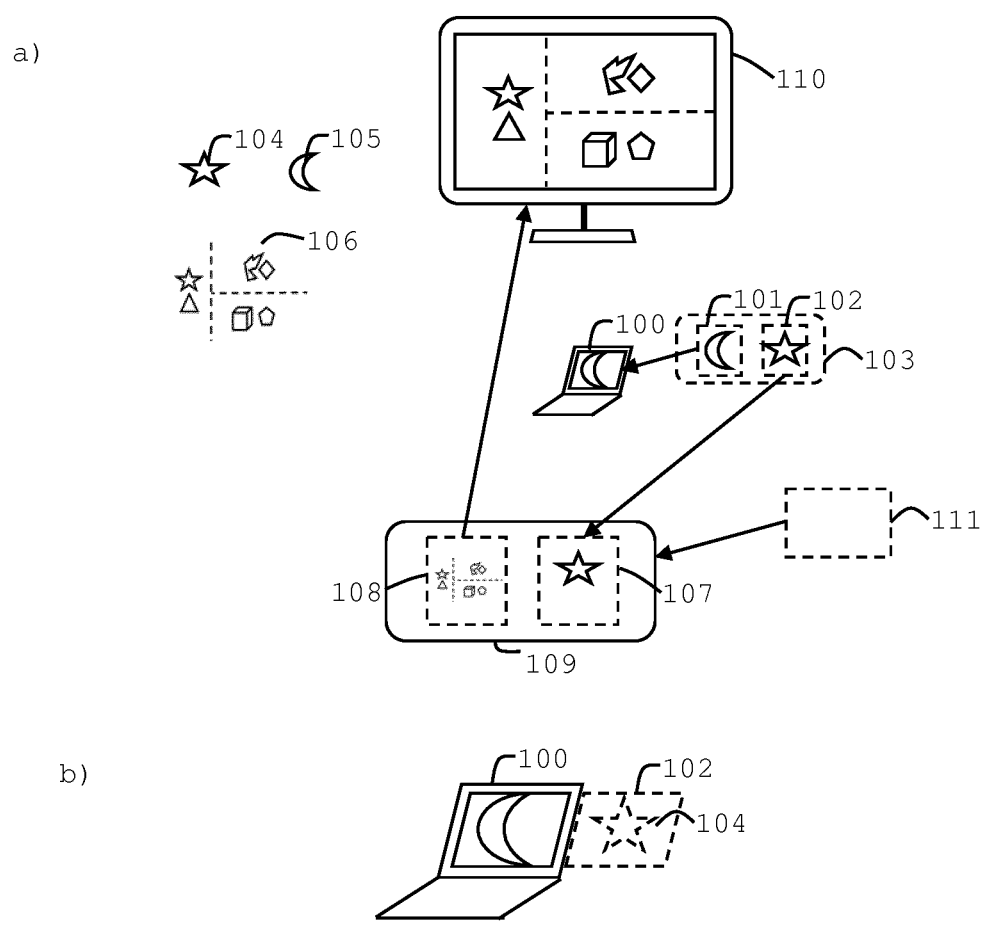
Figure 8 (hidden buffer of BYOD)

COLLABORATION PLATFORM HAVING MODERATED CONTENT FLOW

The present invention relates to an electronic system or network and method for interactive real-time collaboration wherein the content flow can be moderated, as well as to a primary or secondary node for use in such a system.

BACKGROUND OF THE INVENTION

In the field of real-time digital collaboration, there is an increased interest in how to increase ease of sharing content between users and to offer the possibility to have a moderated content flow. A moderated content flow can for example bring forward more focused meetings, or steer the attention of students during lessons. This offers new challenges for the digital systems supporting the collaboration. For example, in a traditional video conferencing the participants mostly share their material with the same priority to all participants at once. Or in the traditional classroom, the digital content flows from the presenter to the audience. It is desired to increase options so that the information can flow in several directions while being moderated when needed. It is also desirable that the users can share content in a user friendly way, within their team or between teams.

SUMMARY OF THE INVENTION

It is an objective of the present invention to provide a system and method where the content flow in the system can be moderated, e.g. by a user. It is a further objective of the present invention to provide node device for use in such a system.

Embodiments of the present invention relate to moderated sharing system and method suitable for collaboration. The above objective can be solved by the control of image buffers networked displays. The data is preferably composited and sent as one stream, e.g. to any secondary node.

Embodiments of the present invention do not rely on metadata (e.g. where rights etc. are defined) that is sent along with the data stream In one embodiment of the present invention there is provided a system having a primary node and at least one secondary node connected over a local area network, at least one computing device having a display output, and a control service, where each node is connected to at least one dedicated display device, and each node having at least two image buffers buffering buffer content, wherein for each node, the selection of the buffer content of which image buffer is displayed onto the dedicated display depends on a state variable of the control service.

The system can enable moderation of content flow, and different state variables can enable different working modes having different ways of moderating the content flow. The different state variables and the expected execution steps for each state variable are determined in advance.

The image buffers have buffer content which is buffered or stored temporarily. As only a temporary storage is required the image buffer may be in RAM (random access memory) or non-volatile memory.

For example, the system can have a first value of said state variable, so that for at least one secondary node, buffer content in at least one image buffer is not displayed onto the dedicated display device while buffer content in at least one other image buffer is displayed onto the dedicated display device.

In this way at least one image buffer is hidden so that content can be processed without being displayed. For example, it might not be wanted to display an intermediate image processing step. In general, a hidden buffer can make possible to have a parallel task running without having to display it. A hidden buffer is sometimes called a "black buffer" or "back buffer".

For example, the buffer content in the at least one image buffer, whose content is displayed onto the dedicated display device of the secondary node, can comprise input from at least one image buffer of the primary node. Said content may be a composition of at least one sub-content, and the sub-content may be provided from at least one image buffer of at least one secondary node and/or the primary node itself.

Thus, content from the primary node can be displayed onto a dedicated display. This content may comprise content from any secondary node and/or the primary node, so that the content from several nodes can be shared to several nodes.

This implies further that for any node, the content received by the node can comprise sub-content from the same node, i.e. itself. In this way the same content is shared to all nodes.

For example, for each secondary node, the buffer content in the at least one image buffer, whose content is not displayed onto the dedicated display device, can comprise output intended for the primary node. The content can be provided from at least one computing device.

Thus, users can share content from e.g. a BYOD to any node.

For example, the layout of each composition can be preserved so that all users can see and refer to the same content.

For example, the system can have a second value of said state variable, so that for each of the at least one secondary node, the image buffer, whose buffer content is displayed onto the dedicated display device, comprises content that is not originating from any secondary node. The image can for example be a web page.

In this way the moderator can stop the contribution from the secondary nodes, for example to steer the attention of the participants.

For example, (for the second value of the state variable) at least one computing device can output content to at least one image buffer of the primary node, said image buffer comprises content of the computing device and said content is outputted on the dedicated display. Said content can be a composition of sub-content from at least one computing device.

In this way the moderator can still output content, from one or several computing devices, on the dedicated display of the primary node.

For example, (for the second value of the state variable) for at least one secondary node, the at least one image buffer, whose content is displayed onto the dedicated display device, can be blocked from receiving input, e.g. from any computing device.

In this way the moderator can further select which content is being shared.

For example, the system can have a third value of said state variable, so that for each node, a first buffer of the node comprises content from the at least one computing device, and said content is output to the dedicated display. The content can be a composition of sub-content from a multiple of computing devices.

This enables a local sharing between computing devices sharing the same node.

For any value of the state variable there can be provided a computing device that has at least one image buffer comprising buffer content which is not being displayed on the computing device's own display. The buffer content can instead be sent to another image buffer and it can be displayed on a node display. The buffer content may still be manipulated with the input means of the computing device, for example.

This will free up display area on the computing device. The buffer content, and possible manipulation thereof, may still be inspected on another display.

For any value of the state variable, a single frame of any of the above mentioned image buffers may be a single texture. A multiple of such textures can be combined into a new single texture. In this way also composed content can easily be sent anywhere on the network. If new content enters the image buffer, a new texture can be drawn on the fly so that there can be texture per stream.

In one embodiment of the present invention there is provided a method for digital collaboration in a network having a primary node and at least one secondary node connected over a local area network, at least one computing device having a display output, and a control service is provided, wherein each node is connected to at least one dedicated display device, and each node has at least two image buffers, the method comprising, for each node, setting a state variable of the control service to a certain value or having a state variable of the control service being set to a certain value, and depending of the state variable value, the control service instructing one of the node's at least one image buffer to send its buffer content to the dedicated display.

The method can enable moderating a content flow, and different state variables can enable different working modes having different ways of moderating the content flow.

For example, the method can comprise the step of setting the state variable of the primary node to a first value, and for at least one secondary node, the control service instructing at least one image buffer of the secondary node to send its buffer content to the dedicated display device and instructing at least one other image buffer of the secondary node to not send its buffer content to the dedicated display device.

In this way at least one image buffer can be hidden so that content can be processed without being displayed; for example, it might not be wanted to display an intermediate image processing step. In general, a hidden buffer can make possible to have a parallel task running without having to display it.

The method can further comprise that for at least one secondary node, the control service may instruct at least one image buffer of the primary node to send buffer content to the image buffer, whose buffer content is not displayed on the dedicated display device, of the secondary node. Any node can compositing sub-content in any of its at least one image buffer. The primary node may receive buffer content from at least one image buffer of at least one secondary node and/or at least one image buffer of the primary node, and sending all or part of the content to at least one secondary node.

Thus, buffer content from the primary node can be displayed onto a dedicated display. The content may originate from any secondary node and/or the primary node, so that the content from several nodes can be shared to several nodes.

For example, the method can comprise any node receiving content that comprises sub-content from the same node, i.e. itself.

In this way the same content can be shared to all nodes.

The method can further comprise, for at least one secondary node, sending buffer content of the first image buffer of the secondary node to the primary node. The buffer content may originate from at least one computing device.

Thus, users can share content from e.g. a BYOD to any node.

The method can further comprise preserving the layout of sub-compositions in any new composition, so that all users can see and refer to the same image content.

For example, the method can comprise the step of setting the state variable of the primary node to a second value, and for each of the at least one secondary node, the control service instructing the primary node to send content to the first image buffer of the secondary node, which is connected to the dedicated display device, and output the buffer content on the dedicated display device, wherein said buffer content is not originating from any secondary node, but can for example be a web page.

In this way the moderator can stop the contribution from the secondary nodes, for example to steer the attention of the participants.

For example, the method can comprise the control service instructing the at least one computing device of the primary node to send content to the primary node, and to output the content onto the dedicated display. The control service may instruct the node to composite the content of the computing devices.

In this way the moderator can still output content, from one or several computing devices, on the dedicated display of the primary node.

For example, the method can comprise for at least one secondary node, blocking the at least one image buffer whose buffer content is displayed onto the dedicated display device, from receiving input from any computing device.

For example, the method can comprise the step of setting the state variable of the primary node to a third value and for each node, a first image buffer of the node receiving content from the at least one computing device, and outputting said buffer content to the dedicated display. The node can be instructed to compositing sub-content from a multiple of computing devices.

This enables a local sharing between computing devices sharing the same node.

For example, for any state variable, the method can comprise a computing device having at least one image buffer and instructing the computing device to not show the buffer content of at least one image buffer onto its own display. The buffer content may be sent to another image buffer and may be displayed on a node display. The content may still be manipulated with the input means of the computing device.

This will free up display area on the computing device. The buffer content, and possible manipulation thereof, may still be inspected on another display.

For example, for any state variable, the method can comprise compositing a single frame of any of the above mentioned image buffers into a single texture. A multiple of such textures can be combined again into a new single texture.

In this way also composed content can easily be sent anywhere on the network. If new content enters the image buffer, a new texture can be drawn on the fly so that there can be texture per stream.

An embodiment of present invention provides a node for use in a system for digital collaboration comprising a primary node and at least one secondary node connected over a local area network, at least one computing device having a display output, and a control service, wherein the node is adapted to be connected to at least one dedicated display device, and the node having at least two image buffers each image buffer having buffered content and the node being adapted to receive instructions from a control service, wherein the selection of which buffer content of an image buffer is displayed onto the dedicated display depends on a state variable received from the control service. Such a node can be a primary node.

In another embodiment a node for use in a system for digital collaboration is provided, the system comprising a primary node and at least one secondary node connected over a local area network, at least one computing device having a display output, and a control service, wherein each node is connected to at least one dedicated display device, and the node having at least two image buffers, the node being adapted to receive a state variable of a certain value from the control service, and the node being adapted to send buffer content of one image buffer to the dedicated display device and at least one other image buffer of the node to not send its buffer content to the dedicated display device. Such a node can be a secondary node.

In another embodiment a computer program product is provided adapted to work with a digital collaboration system comprising a primary node and at least one secondary node connected over a local area network, at least one computing device having a display output, and a control service, where each node is connected to at least one dedicated display device, and each node having at least two image buffers, the software being adapted to carry out the following functions when the software is loaded onto the respective device or devices and executed on one or more processing engines:

for each node, setting a state variable of the control service to a certain value, and depending of the state variable value, the control service instructing one of the node's at least one image buffer to send its buffer content to the dedicated display.

The computer program product can be stored on a non-transitory signal storage medium comprising any of an optical disk, a digital magnetic tape, a magnetic disk, a solid state memory such as a USB flash memory, a ROM.

BRIEF DESCRIPTION OF THE DRAWINGS

FIG. 1 shows an embodiment of the present invention comprising several nodes, BYODs and node displays.

FIG. 2 shows an embodiment of the present invention comprising a node with two image buffers where one image buffer is outputted to a display.

FIGS. 3 a) and b) show an embodiment of the present invention comprising the content of node 1 being shared to all nodes.

FIG. 4 shows an embodiment of the present invention comprising the content of the primary node being shared to all nodes.

FIG. 5 shows an embodiment of the present invention comprising a blanking mode.

FIG. 6 shows an embodiment of the present invention comprising a collaboration mode.

FIG. 7 shows an embodiment of the present invention comprising composed content from all nodes being composed and shared.

FIGS. 8a) and 8b) show an embodiment of the present invention comprising a hidden buffer of a computing device.

DEFINITIONS

Figure 9:
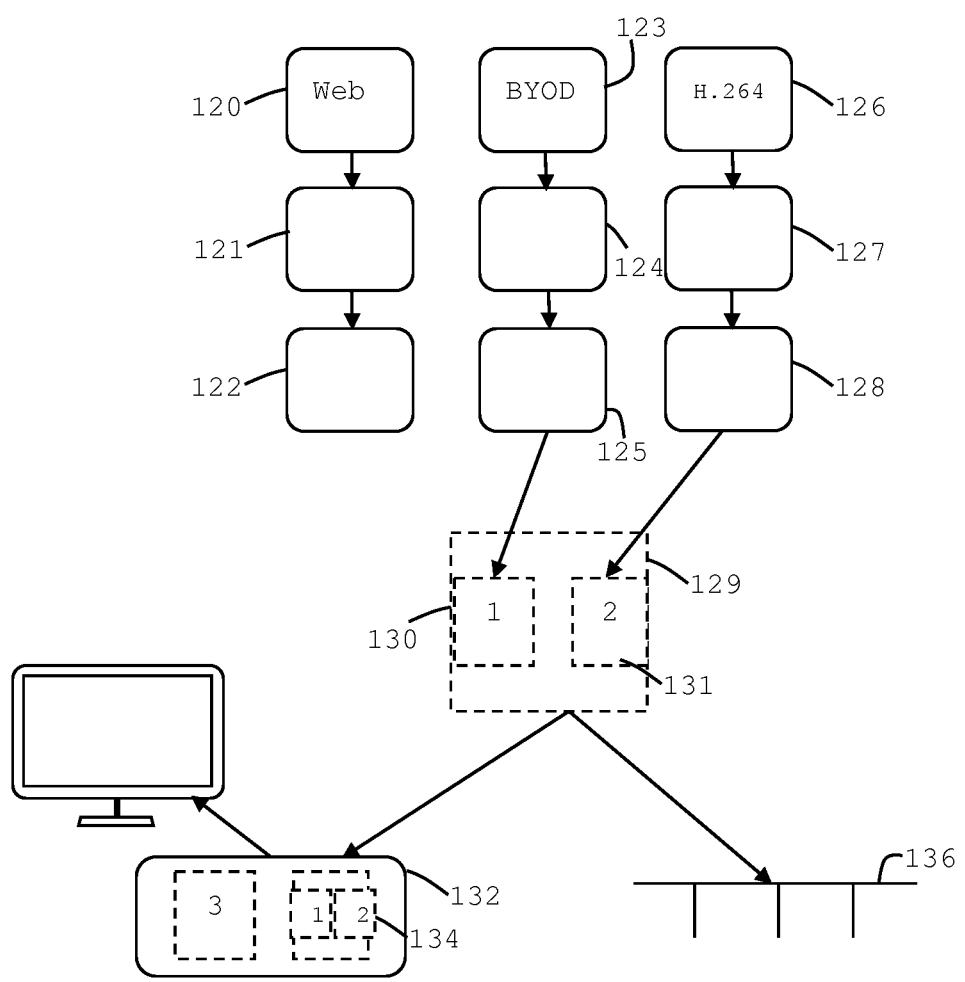
FIG. 9 shows an embodiment of the present invention comprising the formation of textures.

The present invention provides a collaboration platform giving users the possibility to work together in groups on collaboration islands and share their content to a group screen, still giving the primary user, or moderator, full control of e.g.

- if secondary users can collaborate in their collaboration islands
- forcing certain content to the display screens of the collaboration islands, for example, content of one island can be cloned to all displays in the room
- "blanking" the screen of the collaboration islands and hereby drawing the attention of the users The collaboration system can be implemented using network node devices, hereafter referred to as "nodes". These devices can be connected with each other to obtain a scalable system. They can send and receive data streams as well as perform compositions of multiple streams. They can also receive instructions from e.g. remote control services that may be located in a remote server or a cloud server. A node can be a physical box or it can be implemented as a computer program product directly in a meeting device or in a display or as a cloud service.

A "BYOD" (Bring Your Own Device) is any computation device for personal use and can comprise laptops, mobile phones, smartphones, tablets, palm pads and the like, hence is a processing device. In the present context it can also include a stationary computer. The computation device has means for providing content that can be outputted on an internal or external display device.

A node can be connected to at least one BYOD and to at least one display device.

A "display device" can comprise display external devices such as e.g. display monitors, TV screens or projectors. Display devices may be equipped with interaction functionality such as a touch sensitive screen surface.

A "data stream" comprises any type of content that can be inspected on any display device in the collaboration platform, for example images, recorded videos, real-life camera streams, documents, etc. Along with the video data, a data stream may contain audio data as well as meta data such as keyboard and mouse events.

An "instruction" includes within its scope a command sent from the platform application to the control service, requesting the latter to arrange the system in a certain configuration or direct data streams along a certain path.

A "control service" relates to a process (or group of processes) that can supply instructions to any or all of the nodes of the system from which the node can understand how to manipulate data streams.

The control service can run on a local or a remote (e.g. cloud) server. In particular, the control service is adapted to transmit one or more state variables.

A "primary" or a "secondary" node is a digital processing device capable of executing computer programs and hence has a processing engine such as a microprocessor. It also has a memory such as RAM and non-volatile memory, as well as I/O interfaces like any of network cards for wireless or wired connection to a network such as a local area network, serial ports such as USB ports, an optical disk external or internal signal medium storage reader, input devices such as keyboards, or a touchscreen, a digitizer, a pointing device.

A "processing device" is a digital processing device capable of executing computer programs and hence has a processing engine such as a microprocessor. It also has a memory such as RAM and non-volatile memory, as well as I/O interfaces like any of network cards for wireless or wired connection to a network such as a local area network, serial ports such as USB ports, an optical disk external or internal signal medium storage reader, input devices such as keyboards or touchscreens, digitizers, a pointing device. A processing device can be a laptop, a palmtop, a personal computer tower, a smartphone, a PDA, a workstation, a tablet or similar.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analogue circuitry, integrated to any degree, and not limited to general purpose processors, digital signal processors, ASICs, FPGAs, discrete components or transistor logic gates and so on.

FIG. 1 shows an overview of an embodiment of the present invention where an interactive collaboration platform 1 comprises a primary node 2 and two secondary nodes 3 and 4. All nodes are connected to a switch or hub 5, which in turn can be connected to a server 6, located locally or remotely in the cloud 7. The cloud server 6 can provide various services and applications to manage the system. The primary node 2 is in the present embodiment connected with a processing device such as a laptop 8, a node display 9 and a projector 10. The secondary node 3 is connected with two processing devices such as laptops 11 and 12, one tablet 13 and one node display 14, and the secondary node 4 is connected with two processing devices such as laptops 15 and 16, and one smartphone 17, and a node display 21. The platform 1 also comprises an arbitrary input device 18, i.e. this could be implemented as a touch screen or be integrated with a BYOD of the primary node. All local processing devices are connected to a local area network (LAN), managed by the switch or hub 5. Auxiliary supportive devices that are not themselves networked, for example a document camera or a processing device such as a personal computer, can be connected to the LAN 19 via an encoder (not shown). Any collection of such processing devices are in FIG. 1 represented by member 20.

FIG. 2 shows and embodiment of the present invention showing a node 30 with a first and second image buffer 31 and 32 respectively, where only image buffer 32 is output 33 to the display 34. The other image buffer may interact with other nodes in the network, e.g. sending stream 110 and receiving stream 111, but its content is not or does not have to be displayed on the display device 34. Image buffer 32 receives a stream 111.

FIG. 3a) shows another embodiment of the present invention where the primary node 40 comprises a first and second buffer 41 and 42 respectively, the secondary node 50 comprises a first and second image buffer 51 and 52 respectively, and the secondary node 60 comprises a first and second image buffer 61 and 62 respectively. The primary node has some "bring your own device" (BYOD) apparatuses 43 connected to its first image buffer 41. It further outputs 45 the buffer content of its second image buffer 42 to its dedicated display 44. The secondary node 50 has BYOD 53 connected to its second image buffer 52 but outputs 55 the buffer content of its first image buffer 51 to its dedicated display 54. The same configuration is mutatis mutandis implemented for the secondary node 60. The situation in FIG. 3a) is that the content of node 50 is reproduced or cloned to all displays. This is implemented by having the buffer content of node 50's second image buffer 52 sent in a stream 56 to the second buffer 42 of the primary node 50. The buffer content of second buffer 42 is sent in a new stream 46 to node 50 and 47 to node 60. Stream 46 and 47 can also be one single stream when using multicast. Multicast is when only one stream is sent out and multiple nodes listen to it and may receive it. At the same time the buffer content in buffer 42 is also sent to the display 44. This configuration makes sure that all participants will look at the same content. Note that the buffer content displayed on the display 54 of node 50 is not coming from any buffer of node 50 but from the second buffer 42 of the primary node 40.

FIG. 3b) shows the configuration of FIG. 3a) where each node is connected with a processing device such as a laptop (as BYOD device) that provides an image, 43, 53 and 63 respectively. Laptop 53 sends image 71 to buffer 52, laptop 43 sends image 70 to buffer 41, laptop 63 sends image 72 to buffer 62. If the user of primary node 40 wants the content of node 50 to be cloned or shared to all nodes, he/she makes a request to the platform application which is adapted to receive such a request. In response to the received request, the application will assign a corresponding value of a state variable associated with the primary node. The communication is handled by a control service, and both the control service and the platform application may be located remotely. The control service now instructs the primary node to show the content of stream 56 from buffer 52 of the secondary node 50 in buffer 42 (of the primary node 40). According to the request the control service instructs the content of buffer 42 to be sent to the secondary nodes 50 and 60, to their buffers 51 and 61 respectively. The control service further instructs that the content of buffers 51, 61 and 42 should be outputted on the displays 54, 64 and 44, associated with their respective nodes. In this way the content 71 of laptop 53 can be shared to all participants in the session. Note that the content not to be shared, images 70 and 72 on laptops 43 and 63 respectively, can be sent to buffers 41 and 62 on their respective nodes, but the images are not shown on their dedicated displays 44 and 64, in the current request. Also note that the image 71 is passing the primary node 40 before being outputted to "its" node display 54. This makes further operations possible on the content in the more complex cases (e.g. in FIG. 5).

The user of the primary node can request to the platform application to clone or share the content of a primary node BYOD to all nodes and the platform is adapted to receive and process such a request. This is indicated in FIG. 4 where the laptop 43 comprises an image 70 which is sent to buffer 42 on node 40. The control services instructs the node 40 to send the content of buffer 42 in a stream 46 to buffer 51 of node 50, and in a stream 47 to buffer 61 of node 60. Stream 46 and 47 can also be one single stream when using multicast. Multicast is when only one stream is sent out and multiple nodes listen to it and may receive it. The control service also instructs that the content of buffers 51, 42 and 61 should be outputted to the node displays 54, 44 and 64 respectively. Note that local contents 71 and 72 at the nodes 50 and 60 may be sent to the node buffers 52 and 62, but they are not displayed on the node displays.

The session can also be moderated via the primary node. FIG. 5 shows an embodiment of the present invention where the primary node has the possibility to instruct the control service to lock the functionality of the BYODs for all secondary nodes, this is indicated by 100 and 101. At the same time an arbitrary image, for example a certain webpage, a static image or a movie is shown in the buffers connected to secondary node displays. In this way the user of the primary node can get the attention of the users of the secondary nodes.

FIG. 6 shows and embodiment of the present invention where the users of the secondary nodes are allowed to work in a traditional local way. Node 50 is connected with a processing device such as a laptop 53 showing content 71, and to a processing device such as a tablet 57 showing content 81. Both processing devices 53 and 57 send their content to the node 50, which composes the content as per desired layout 91 into buffer 52. The secondary node 60 is connected with a processing device such as a laptop 63 showing content 72, which is sent to buffer 62 and outputted on node display 64. The primary node is connected with the processing device such as laptop 43 showing content 70, which is sent to buffer 42 and outputted to node display 44. The different nodes work in parallel and independent of each other. This "collaboration mode" can be selected by setting a state variable of the control service to a certain value. This will trigger the control service to instruct the buffers to receive the content of processing devices such as the BYODs and forward this to the respective node display.

FIG. 7 shows an embodiment of the present invention where content from all nodes can be cloned to or shared with all nodes. In the present case an additional processing device such as a BYOD has been added to each node, namely processing devices like tablets 57, 49 and 66 respectively. Each node has the ability to make a composition of the input from at least one processing device such as a BYOD. So for secondary node 50, the content 71 of the processing devices such as laptop 53 and content 81 of tablet 57 are sent to buffer 52 and composed into a new content 91, which is sent in stream 56 to buffer 42 of primary node 40. For secondary node 60, content 72 of a processing device such as laptop 63 and content 82 of tablet 66 are sent to buffer 62 and composed into a new content 92, which is sent in stream 48 to buffer 42 of primary node 40. And for the primary node 40, content 70 of processing devices such as laptop 43 and content 80 of tablet 49 are sent to buffer 42. In buffer 42, all streams are composed into a new content 93 and sent to the primary node display 44 as well as to the buffer 51 of node 50 and 61 of node 60. The secondary nodes get instructed to output the content of their first buffers 51 and 61 to their respective node display 54 and 64. Again, the content of the buffers 52 and 62 of the secondary nodes are not displayed on any node display, it is only the finally composed content from the primary node that is displayed on the node displays. In this way the primary node can control of what content is displayed. If a new processing device such as a BYOD is added to any node, its content can be added in the same manner as described above, to a sub-composition on a secondary node or to the final composition of the primary node, and sent back to all nodes (or any node requested by the primary node).

The compositions are implemented using textures so that a stream only comprises a single texture stream. In this way the actual layout of each sub-composition is preserved and all nodes are displaying the content in the same manner. Thus, the users do not have to add comments due to discrepancies in orientation or position on the screen when discussing the content.

The control service may be operated remotely from a server in the cloud, but the data streams carrying the shared content may be transferred over the local area network. This is increasing speed and robustness to the system so that the real-time collaboration proceed with little delay and risk of disturbances on an external network.

The above embodiments have been implemented with one primary node, two secondary nodes, and two processing devices such as BYODs connected with each node. This should not be seen as a limitation of the invention. A typical setup can be implemented with 6 secondary nodes and 2-6 processing devices such as 2-6 BYODS connected to each secondary node, which is probably rather based on the real situation. If the users are students in an active classroom session it would be unpractical for there to be too many users at each node, or too many nodes in one classroom. The system typically has one primary node with a first display device connected to it, and in many cases a second display device, for example a projector for wall projection. And for practical reasons the moderator (e.g. a teacher) would probably have about 2 processing devices such as 2 BYODs connected to the primary node. The invention is however not technically limited to these figures.

In case the primary node is connected with a second display device, it can show the same content as the first display by connecting it to the same buffer. Or it can show the content of the second buffer. In principle there can be more than two display devices connected with the primary node. In principle there can also be more than two buffers in any node of the collaboration platform.

The principle of having a "hidden image buffer", i.e. an image buffer not sending its content to the immediate/closest display can also be applied to a computing device. FIG. 8a) shows an embodiment of the present invention where a computing device (a laptop) 100 has image buffers 101 and 102 in a memory 103. The content 105 of image buffer 101 is shown on the laptop display while the content 104 of buffer 102 is not shown on the display of the laptop 100, but sent to image buffer 107 of node 109. The user of laptop 100 can see and manipulate the content 104 via the node display 110. Thus the user can still manipulate the content 104 on his laptop, without seeing it on his laptop display, but only see the effect of the manipulations where the content is displayed, which in this case is on display 110. (111 in FIG. 8a depicts other inputs to the node image buffers 108 and 107 that would make up the final content 106.) FIG. 8b shows how the user can experience the hidden image buffer 102 as an extended desktop that he can't see on his laptop 100. The cursor movements can e.g. be adapted so that they correspond to an arbitrary location of the content 104. This could be next to the laptop, or it could be in a direction of the display where the content is actually shown, in order to make it intuitive for the user. The "hidden image buffer" can increase the possibility for the user of working with several tasks in parallel. Thus, the situation in FIG. 8 can be combined with that of FIG. 7 so that a computing device can have a "hidden image buffer" whose content is sent to a node image buffer and displayed on a dedicated node display.

The different contents from different sources and buffers can be made into a single texture (or a stream of textures). In this way it is easy to send the content around to any destination point. FIG. 9 shows an example of how this can be done with content from different sources, in this case a page on a web address 120, a stream 123 from a BYOD and a H.264 stream 126 e.g. from a (document) camera. The Web address 120 can be sent to a web browser engine 121; the BYOD stream 123 and the H.264 stream can each be send to a decoder 124 and 127 respectively. The resulting contents can be brought into one texture each, 122, 125 and 128 respectively. The textures can then each be sent as a stream (each frame is a texture) to any destination with any refresh rate. In the example in FIG. 9, the BYOD texture 125 and h.264 texture 128 are rendered into a new texture 129. The texture 129 may be rendered into the image buffer 134 of node 132, and as such outputted onto the dedicated display. It is also possible to send the content of texture 129 after encoding to the network 136 (for example the LAN 19 in FIG. 1). It does not matter that the sources or destinations have different frame rates. For example, the processing device such as BYOD 123 can run with 15 frames per second, fps, the h.264 stream can run with 30 fps, the image buffer of a display can run with 60 fps and the network stream can contain 30 fps. Each texture (at any level) can again be composed into a new texture, e.g. if more content is added to any image buffer already having content. The compositing can be done on the fly, in real time.

In accordance with another embodiment of the present invention software may be implemented as a computer program product which has been compiled for a processing engine in a node or a processing device e.g. the devices described above. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The software can be embodied in a computer program product adapted to work with a digital collaboration system comprising a primary node and at least one secondary node connected over a local area network, at least one computing device having a display output, and a control service, where each node is connected to at least one dedicated display device, and each node having at least two image buffers. The software is adapted to carry out the following functions when the software is loaded onto the respective device or devices and executed on one or more processing engines such as microprocessors, ASIC's, FPGA's etc:

for each node, setting a state variable of the control service to a certain value, and depending of the state variable value, the control service instructing one of the node's at least one image buffer to send its buffer content to the dedicated display.

The software is adapted to carry out the following functions when the software is loaded onto the respective device or devices and executed on one or more processing engines such as microprocessors, ASIC's, FPGA's etc:

setting the state variable of the primary node to a first value, and for at least one secondary node, and/or the control service instructing at least one image buffer of the secondary node to send its buffer content to the dedicated display device and instructing at least one other image buffer of the secondary node to not send its buffer content to the dedicated display device.

The software is adapted to carry out the following functions when the software is loaded onto the respective device or devices and executed on one or more processing engines such as microprocessors, ASIC's, FPGA's etc:

for at least one secondary node, the control service instructing at least one image buffer of the primary node to send buffer content to the image buffer, whose content is not displayed onto the dedicated display device, of the secondary node and/or for any node compositing sub-content in any of its at least one buffer.

The software is adapted to carry out the following functions when the software is loaded onto the respective device or devices and executed on one or more processing engines such as microprocessors, ASIC's, FPGA's etc:

the primary node receiving buffer content from at least one image buffer of at least one secondary node and sending all or part of the buffer content to at least one secondary node, and/or the primary node receiving buffer content from at least one image buffer of at least one secondary node and/or at least one image buffer of the primary node, and sending all or part of the buffer content to at least one secondary node.

The software is adapted to carry out the following functions when the software is loaded onto the respective device or devices and executed on one or more processing engines such as microprocessors, ASIC's, FPGA's etc:

for any node, receiving buffer content that comprises sub-content from the same node, and/or for at least one secondary node, sending buffer content of the first buffer of the secondary node to the primary node, and/or the buffer content originates from at least one computing device, and/or preserving the layout of sub-compositions in any new composition.

The software is adapted to carry out the following functions when the software is loaded onto the respective device or devices and executed on one or more processing engines such as microprocessors, ASIC's, FPGA's etc:

setting the state variable of the control service to a second value, and for each of the at least one secondary node, the control service instructing the primary node to send content to the buffer of the secondary node, which is connected to the dedicated display device, and output the buffer content on the dedicated display device, wherein said buffer content is not originating from any secondary node.

The software is adapted to carry out the following functions when the software is loaded onto the respective device or devices and executed on one or more processing engines such as microprocessors, ASIC's, FPGA's etc:

the control service instructing the at least one computing device of the primary node to send content to the primary node, and to output the content onto the dedicated display.

The software is adapted to carry out the following functions when the software is loaded onto the respective device or devices and executed on one or more processing engines such as microprocessors, ASIC's, FPGA's etc:

the control service instructing the primary node to compose sub-content from a multiple of computing devices.

The software is adapted to carry out the following functions when the software is loaded onto the respective device or devices and executed on one or more processing engines such as microprocessors, ASIC's, FPGA's etc:

for at least one secondary node, blocking the at least one image buffer, whose buffer content is displayed onto the dedicated display device, from receiving input from any computing device, and/or using a predefined buffer content being a webpage.

The software is adapted to carry out the following functions when the software is loaded onto the respective device or devices and executed on one or more processing engines such as microprocessors, ASIC's, FPGA's etc:

setting the state variable of the primary node to a third value, and for each node, a first buffer of the node receiving content from the at least one computing device, and outputting said content to the dedicated display.

The software is adapted to carry out the following functions when the software is loaded onto the respective device or devices and executed on one or more processing engines such as microprocessors, ASIC's, FPGA's etc:

compositing sub-content from a multiple of computing devices.

The software is adapted to carry out the following functions when the software is loaded onto the respective device or devices and executed on one or more processing engines such as microprocessors, ASIC's, FPGA's etc:

a computing device having at least one image buffer and instructing the computing device to not show the buffer content of at least one image buffer onto its own display and/or instructing the computing device to send the content not being displayed on the computing device's own display, to another image buffer.

The software is adapted to carry out the following functions when the software is loaded onto the respective device or devices and executed on one or more processing engines such as microprocessors, ASIC's, FPGA's etc:

instructing the computing device to send the content not being displayed on the computing device's own display, to another image buffer and display it on a node display, and/or instructing the computing device to receive input from the input means of the computing device for manipulating the content not being displayed on the computing device's own display.

The software is adapted to carry out the following functions when the software is loaded onto the respective device or devices and executed on one or more processing engines such as microprocessors, ASIC's, FPGA's etc:

compositing a single frame of any of the above mentioned image buffers into a single texture.

The software is adapted to carry out the following functions when the software is loaded onto the respective device or devices and executed on one or more processing engines such as microprocessors, ASIC's, FPGA's etc:

combining a multiple of textures into a new texture.

The invention claimed is:

1. A system for digital collaboration comprising:
a primary node and at least one secondary node connected over a local area network,
at least one computing or processing device having a display output, and
a control service, where each node is connected to at least one dedicated display device, and
each node having at least two image buffers comprising at least a first and a second image buffer, the first image buffer having a first buffered content from a first processing device, the second image buffer having a second buffered content from a second processing device,
wherein for each node, the selection of which buffered content of an image buffer is displayed onto the dedicated display depends on a state variable of the control service,
and wherein the second buffered content of the primary node is different from the second buffered content of the at least one secondary node.

2. The system according to claim 1, wherein the state variable of the control service has a first value, so that for at least one secondary node, buffered content in at least one image buffer is not displayed onto the dedicated display device and buffered content in at least one other image buffer is displayed onto the dedicated display device.

3. The system according to claim 1, wherein content in the at least one image buffer, whose buffered content is displayed onto the dedicated display device of the secondary node, comprises input from at least one image buffer of the primary node.

4. The system according to claim 2, wherein buffered content in any image buffer is a composition of at least one sub-content.

5. The system according to claim 2 comprising at least two secondary nodes, wherein input from the primary node comprises a composition of buffered content from the at least one image buffer of at least two secondary nodes.

6. The system according to claim 2, wherein input from the primary node comprises buffered content from at least one image buffer of at least one secondary node and/or at least one image buffer of the primary node.

7. The system according to claim 2, wherein for each secondary node, the buffered content in the at least one image buffer, whose content is not displayed onto the dedicated display device, comprises output intended for the primary node.

8. The system according to claim 7, wherein the output comprises buffered content from at least one processing device.

9. The system according to claim 4, wherein in any composition the layout of any sub-composition is preserved.

10. The system according to claim 1, wherein the state variable of the control service has a second value so that for each of the at least one secondary node, the image buffer, whose buffered content is displayed onto the dedicated display device, comprises buffered content that is not originating from any secondary node.

11. The system according to claim 10, wherein at least one processing device is outputting buffered content to at least one image buffer of the primary node, said image buffer comprises buffered content of the processing device and said buffered content is outputted on the dedicated display.

12. The system according to claim 11, wherein the buffered content comprises a composition of sub-content from a multiple of processing devices.

13. The system according to claim 10, wherein for at least one secondary node, the at least one image buffer, whose buffered content is displayed onto the dedicated display device, is blocked from receiving input from any processing device.

14. The system according to claim 10, wherein the predefined content is a webpage.

15. The system according to claim 1, wherein the state variable of the control service has a third value so that for each node, a first buffer of the node comprises content from the at least one processing device, and said content is outputted to the dedicated display.

16. The system according to claim 15, wherein the content comprises a composition of sub-content from a multiple of processing devices.

17. The system according to claim 1, wherein a processing device has at least one image buffer that comprise buffer content which is not being displayed on the processing device's own display.

18. The system according to claim 17, wherein the content not being displayed on the processing device's own display is submitted to any of being sent to another image buffer or being manipulated with the input means of the processing device.

19. A method for digital collaboration comprising a primary node and at least one secondary node connected over a local area network, at least one computing or processing device having a display output, and a control service, where each node is connected to at least one dedicated display device, and each node having at least two image buffers comprising at least a first and a second image buffer, the method comprising:
for each node, the first image buffer receiving a first buffered content from a first processing device, the second image buffer receiving a second buffered content from a second processing device, and
setting a state variable of the control service to a certain value, and depending of the state variable value, the control service instructing one of the node's at least one image buffer to send its buffered content to the dedicated display, and
wherein the second buffered content of the primary node is different from the second buffered content of the at least one secondary node.

20. The method according to claim 19 comprising at least two secondary nodes, the method comprising the primary node receiving buffered content from at least one image buffer of the at least two secondary nodes and sending a composition of all or part of the buffered content to at least one secondary node.

21. A computer program product adapted to work with a digital collaboration system comprising a primary node and at least one secondary node connected over a local area network, at least one computing device or processing device having a display output, and a control service, where each node is connected to at least one dedicated display device, and each node having at least two image buffers comprising at least a first and a second image buffer, the software being adapted to carry out the following functions when the software is loaded onto the respective device or devices and executed on one or more processing engines:
the first image buffer being adapted to receive a first buffered content from a first processing device, the second image buffer being adapted to receive a second buffered content from a second processing device and
for each node, setting a state variable of the control service to a certain value, and depending of the state variable value, the control service instructing one of the node's at least one image buffer to send its buffered content to the dedicated display,
wherein the second buffered content of the primary node is different from the second buffered content of the at least one secondary node.

22. The computer program product of claim 21 stored on a non-transitory signal storage medium comprising any of an optical disk, a digital magnetic tape, a magnetic disk, a solid state memory, a ROM.

23. The system according to claim 1, wherein the primary node is configured to share content of an image buffer to another image buffer of the at least one secondary node.

24. The method according to claim 19, further comprising the step of the primary node sharing content of an image buffer to another image buffer of the at least one secondary node.

25. The computer program product of claim 21, wherein the primary node is adapted to share content of an image buffer to another image buffer of the at least one secondary node.

* * * * *